3,254,128
CATALYTIC DEHYDROGENATION OF PRIMARY ALCOHOLS TO ALDEHYDES

Hugh J. Hagemeyer, Jr., and Sam H. Johnson, Jr., Longview, Tex., assignors to Eastman Kodak Company, Rochester, N.Y., a corporation of New Jersey
No Drawing. Filed Nov. 9, 1961, Ser. No. 151,154
2 Claims. (Cl. 260—603)

This invention relates to the dehydrogenation of primary alcohols to the corresponding aldehydes and to a dehydrogenation catalyst composition for effecting this conversion of primary alcohols to aldehydes.

An object of this invention is a novel catalyst composition for use in the conversion of primary alcohols containing four to fourteen carbon atoms to the corresponding aldehyde.

Another object of this invention is the dehydrogenation of a primary alcohol containing four to fourteen carbon atoms to the corresponding aldehyde whereby the yield of the aldehyde is substantially greater than the yields obtained heretofore.

A further object of this invention is the preparation of a catalyst composition having improved stability at elevated temperatures, good resistance to poisoning, and high activity and selectivity, which catalyst composition is highly satisfactory for use in the catalytic dehydrogenation of primary alcohols containing four to fourteen carbon atoms to the corresponding aldehydes.

In accordance with this invention there is provided a novel method for the conversion of primary $C_4$–$C_{14}$ alcohols, both saturated and unsaturated, to the corresponding aldehydes whereby there is provided substantial increase in the yields of the aldehydes over prior art methods.

Further, and in accordance with this invention, there is provided a novel catalyst composition for use in carrying out the catalytic dehydrogenation of saturated and unsaturated primary $C_4$–$C_{14}$ alcohols to the corresponding aldehydes. The catalyst composition of this invention provides for a substantial increase in yield of aldehyde over the yields obtained with the use of prior art catalysts. The catalyst composition of this invention has high activity and selectivity, good stability at elevated temperatures, and good resistance to poisoning. Further, the catalyst composition can be easily and readily regenerated when required. Thus, the activity of the catalyst composition of this invention is such that there results a substantial conversion of the alcohol coming into contact therewith, and the high selectivity of the catalyst composition results in the production of a substantial amount of aldehyde during the conversion process.

Heretofore, it has been difficult to obtain good yields of aldehydes in the catalytic dehydrogenation of primary $C_4$–$C_{14}$ alcohols owing to the fact that the catalysts employed heretofore had, together with its dehydrogenation effect, a substantial dehydration effect on the alcohol whereby a large proportion of the alcohol was converted to an olefin or olefins.

The catalyst of this invention is comprised of, by weight, (1) from about 3% to 5% of calcium oxide, (2) from about 3% to 5% of magnesium oxide, (3) from about 2% to 4% of potassium sulfate, (4) from about 5% to 15% of gamma alumina, (5) from about 1% to 5% of chromic oxide, $Cr_2O_3$, (6) and the balance substantially all zinc oxide.

The catalyst composition, as initially prepared is comprised of from about 1% to 5%, by weight, of chromium trioxide, present as an alkali metal salt or as an alkaline earth metal salt thereof such, for example, as potassium chromate, potassium dichromate, sodium chromate, calcium dichromate, barium chromate, and mixtures thereof. After the catalyst has been initially prepared, as detailed hereinafter, it is heated to a temperature of from about 285° C. to 510° C. and there is passed into contact therewith a reducing gas to reduce the $CrO_3$ to $Cr_2O_3$. This reduction of the $CrO_3$ to $Cr_2O_3$ is most conveniently accomplished by placing pellets of the initially prepared composition, which will contain an alkali metal salt or an alkaline earth metal salt of chromium trioxide as above set forth, and passing vapors of the alcohol to be converted to the aldehyde into contact therewith. An exothermic reaction takes place almost immediately upon contact and the $CrO_3$ is reduced to $Cr_2O_3$. Continuous passage of alcohol vapors into contact with the catalyst mass, which now contains $Cr_2O_3$ instead of $CrO_3$ will result in a substantial conversion of the alcohol to the aldehyde.

In preparing the catalyst of this invention there is first produced an intimate admixture of an alkali metal salt or an alkaline earth metal salt of chromium trioxide, as set forth above, in an amount sufficient to provide the desired amount of chromium trioxide; gamma alumina in the desired amount; potassium sulfate in the desired amount; a calcium compound which, upon heating at elevated temperatures, will engender calcium oxide; a magnesium compound which, upon heating at elevated temperatures, will engender magnesium oxide; and a zinc compound which, upon heating at elevated temperatures will engender zinc oxide. The amounts of calcium compound, magnesium compound, and zinc compound employed will be sufficient to provide the desired amounts of calcium oxide, magnesium oxide, and zinc oxide in the final catalyst product. The components of the admixture are preferably in finely divided form.

Calcium carbonate is conveniently employed as a source of calcium oxide in preparing the catalyst of this invention. The amount of calcium carbonate employed will be sufficient to provide, after $CO_2$ removal, the desired amount of calcium oxide in the catalyst. Calcium hydroxide or calcium nitrate can also be employed as a source of calcium oxide. Mixtures of two or more of these compounds can be used, if desired.

Magnesium carbonate is conveniently employed as a source of magnesium oxide in the preparation of the catalyst. The amount of magnesium carbonate employed will be sufficient to provide, after heating, the desired amount of magnesium oxide in the catalyst. Magnesium hydroxide and magnesium nitrate can be employed also as a source of magnesium oxide, if desired. Also mixtures of two or more of the above compounds can be employed.

Zinc carbonate and zinc nitrate are examples of compounds that can be employed as a source of zinc oxide. The amount of zinc carbonate, zinc nitrate, or mixtures thereof employed will be sufficient to provide, after heating, the desired amount of zinc oxide in the catalyst.

Compounds such as potassium chromate, potassium dichromate, sodium chromate, calcium dichromate, barium chromate and the like can be employed as a source of $CrO_3$ in the composition as initially prepared. The amount employed will be sufficient to provide in the catalyst mass, after reduction of the $CrO_3$, the desired amount of $Cr_2O_3$. Thus, for example, a composition comprised of 2.8% by weight of $K_2CrO_4$ will have, after reduction, 1.1% by weight of $Cr_2O_3$, 5.2% of $K_2CrO_4$ will provide about 2% of $Cr_2O_3$, and 10.4% of $K_2CrO_4$ will provide about 4% of $Cr_2O_3$. After reduction there will also be present in the catalyst mass a small amount of the oxide of the alkali metal or alkaline earth metal. Thus, in the above examples $K_2O$ will be present in the catalyst mass together with the $Cr_2O_3$.

The intimate admixture is pressed into the form of pellets of desired size in a conventional manner and heated at temperatures of from 775° C. to 900° C., preferably from about 800° C. to 850° C., whereby substantially all volatile constitutents present in the admixture are removed and there is provided a porous pellet having substantial surface area. The pellets are then subjected to a reducing atmosphere whereby the $CrO_3$ is reduced to $Cr_2O_3$.

The amount of $Cr_2O_3$ in the catalyst mass is critical for the purposes of this invention and it is preferred to keep the $Cr_2O_3$ content at from about 1% to 3%. If the amount of $Cr_2O_3$ is increased over the upper 5% limit above set forth, rather large crystals of undesired zinc chromite are formed in the interior of the catalyst mass during use and the activity and selectivity of the catalyst is decreased substantially.

It has been determined that the incorporation of $Cr_2O_3$ into the catalyst mass during its initial preparation does not provide a catalyst so effective as the catalyst containing the $Cr_2O_3$ formed in the manner described above.

The following examples are illustrative of this invention.

*Example I*

An intimate admixture of about 29.7 pounds of finely divided zinc carbonate, about 1.9 pounds of finely divided gamma alumina, about 2.5 pounds of finely divided magnesium carbonate, about 2.1 pounds of finely divided calcium carbonate, about 0.7 pound of finely divided potassium sulfate, and about 0.7 pound of finely divided potassium chromate is compressed into ⅛-inch spherical pellets. The pellets are placed into a roasting oven and heated to a temperature of about 850° C. with air and steam passing through the oven during the heating of the pellet. Heating is continued until the gas being removed from the oven no longer shows the presence of carbon dioxide. The composition thus prepared is white in color and has a pore volume of 0.16 cc. per gram and a crushing strength in the range of 35–50 pounds and is comprised of, by weight, 77.4% zinc oxide, 7.6% gamma alumina, 4.7% calcium oxide, 4.7% magnesium oxide, 2.8% potassium sulfate, and 2.8% potassium chromate. These pellets are employed as such in a dehydrogenation reactor tube. After the initial passage of alcohol vapors through the tube the potassium chromate is converted to $K_2O$ and $Cr_2O_3$. The amount of $Cr_2O_3$ present will be about 1.1% by weight, and the amount of $K_2O$ present will be about 1.7% by weight.

*Example II*

A mixture of about 70.8 pounds of finely divided zinc nitrate hexahydrate, about 1.9 pounds of finely divided gamma alumina, about 7.6 pounds of finely divided magnesium nitrate hexahydrate, about 5.1 pounds of finely divided calcium nitrate hexahydrate, about 0.7 pound of finely divided potassium sulfate, and about 0.7 pound of finely divided potassium chromate is mechanically mixed and pelleted so as to form pellets of the same size and shape as Example I above. These pellets are subjected to roasting heat of a temperature of about 800° C. in the presence of air until all the nitrates are decomposed. The pellets are employed in the same manner as those of Example I, which will be illustrated more fully in Examples IV through XVII.

*Example III*

A mixture of about 28.1 pounds of finely divided zinc carbonate, about 3.2 pounds of finely divided gamma alumina, about 2.6 pounds of finely divided magnesium carbonate, about 2.1 pounds of finely divided calcium carbonate, about 0.5 pound of finely divided potassium chromate, and about 0.7 pound of finely divided potassium sulfate is mechanically mixed and pelleted so as to provide spherical pellets of ⅛ inch diameter. The pellets are roasted at a temperature of about 800° C. in the presence of air until all the carbonates are decomposed. The pellets are employed in the same manner as Example I which will be more fully illustrated in the following examples.

The catalyst composition of the present invention is particularly adapted for the dehydrogenation of saturated and unsaturated primary alcohols of from 4 to 14 carbon atoms such as 2-ethylhexanol; 2-ethylisohexanol; 2,2,4-trimethylpentanol; 2,2-dimethylbutanol; 2,2-dimethylhexanol; 2,2-dimethyloctanol; 2,2,4-trimethylpentenol and the like to the corresponding aldehydes.

The conversion of the primary alcohols to the aldehydes is accomplished by passing the alcohols in vapor form through a tubular member packed with the catalyst of this invention, preferably in the form of pellets, heated to a temperature of from about 285° C. to 510° C., preferably in the range of 410° C. to 485° C., and at a feed rate of from about 0.5 volume to 8 volumes, preferably 0.5 volume to 1.5 volumes, of liquid alcohol per volume of catalyst per hour. The product vapors are passed through a condenser where the aldehydes thus formed and the unreacted alcohol are condensed and separated from the non-condensable gases. These non-condensable gases are predominantly hydrogen and a small amount of olefin hydrocarbons produced during the conversion process.

The following examples are illustrative of the practice of this invention. All parts are by weight unless otherwise indicated.

*Example IV*

A Vycor reactor tube, 30 inches long and 1 inch in cross-sectional diameter, having a thermowell of Vycor tubing of ¼ inch cross-sectional diameter is packed with 38.9 parts of ⅛-inch pellets prepared in accordance with Example I above. The reactor is heated to about 445° C. and about 81,926 parts of 2-ethylhexanol is passed through the tube at a contact time of 10 seconds. (Contact time is figured on the basis of an empty reaction tube.) From the reactor tube is recovered about 79,534 parts of organic material, which is equivalent to a 97.1% recovery. Atmospheric distillation of the recovered organic material yields about 56,494 parts of 2-ethylhexanal, 280 parts of 2-ethylhexene-1, and 22,282 parts of unreacted 2-ethylhexanol. In this example 70% of the alcohol passed through the tube is converted to the aldehyde. In the examples and tables that follow this will be given as percent conversion. Of the alcohol that was converted to some other form 96.2% was converted to the aldehyde. This represents a 96.2% yield of aldehyde. In the examples and tables that follow this will be set forth as percent yield.

*Example V*

A Vycor tube, similar to that employed in Example IV above, is packed with about 38.9 parts of ⅛-inch catalyst pellets prepared in accordance with Example I. The reactor tube is heated to about 440° C. and about 1,222 parts of 2,2,4-trimethylpentanol is passed through the reactor tube at a contact time of about 7.1 seconds. There is recovered about 1,174 parts of organic material. Atmospheric distillation yields 878 parts of 2,2,4-trimethylpentanal having a boiling point of about 145° C., a specific gravity (20° C./20° C.) equal to 0.8177, and $n_D^{25}$ is equal to 1.4108. There is obtained 37 parts of low boiling organic material and 249 parts of unreacted 2,2,4-trimethylpentanol. Thus, in this example there are a 72.9% conversion and a 91.5% yield.

*Example VI*

A Vycor reactor tube of the type employed in Example IV above is packed with about 38.9 parts of the catalyst pellets prepared in accordance with Example III above. The tube is heated to about 440° C. and about 310 parts of 2,2-dimethyloctanol is passed through the reactor tube at a contact time of about 10 seconds. There is recovered about 300 parts of organic material. Atmospheric distillation yields 33 parts of low boiling material, 145 parts of 2,2-dimethyloctanal having a boiling point of about 195° C., a specific gravity (20° C./20° C.) of 0.8209, and $n_D^{25}$ is equal to 1.4201. About 124 parts of unreacted 2,2-dimethyloctanol is recovered also. In this example there are a 47.4% conversion and about a 79% yield.

*Example VII*

A reactor tube, similar to that employed in Example IV, is packed with about 38.9 parts of ⅛-inch pellets prepared in accordance with Example II. The reactor tube is heated to about 435° C. and about 1700 parts of 2,2-dimethylhexanol is passed through the tube at a contact time of 5.9 seconds. There is recovered 1,696 parts of organic material. Atmospheric distillation yields 44 parts of low boiling organic compounds, 1,191 parts of 2,2-dimethylhexanal having a boiling point of about 151° C., a specific gravity (20° C./20° C.) of 0.8150, and $n_D^{25}$ is equal to 1.4103. About 461 parts of unreacted 2,2-dimethylhexanol is recovered also. The conversion is 71.2% and the yield is 97.7%.

*Example VIII*

The catalyst employed in Example VII is regenerated by passing air and steam through the catalyst bed at about 500° C. The reactor tube is then heated to about 435° C. and 1,165 parts of 2,2-dimethylbutanol is passed through the reactor tube at a contact time of about 6 seconds. There is recovered 1,149 parts of organic material from the reactor tube. Atmospheric distillation yields 16 parts of low boiling organic compounds; 785 parts of 2,2-dimethylbutanal having a boiling point of about 104° C., a specific gravity (20° C./20° C.) of 0.8064, and $n_D^{25}$ is equal to 1.3944. About 372 parts of unconverted 2,2-dimethylbutanol is recovered also. A 68.8% conversion and a 96.8% yield are obtained in this example.

*Example IX*

A reaction tube, similar to that employed in Example IV, is packed with about 39 parts of ⅛-inch pellets prepared in accordance with Example I. The reactor tube is heated to about 480° C. Through the tube is passed 1,937 parts of 2-methylbutanol at a contact time of 10 seconds. There is recovered 1,795 parts of organic material. Atmospheric distillation yields about 30 parts of low boiling organic compounds, about 1,137 parts of 2-methylbutanal and about 638 parts of unreacted alcohol. In this example there are a conversion of 59.8% and a yield of about 88.7%.

*Example X*

The same catalyst as that employed in Example IX is heated to about 480° C. and 860 parts of 2,4-dimethylpentanol is passed through the reactor tube at a contact time of 10 seconds. There is recovered about 832 parts of organic material. Atmospheric distillation yields about 27 parts of low boiling organic compounds, about 425 parts of 2,4-dimethylpentanal having a boiling point of about 135° C., and about 380 parts of unreacted 2,4-dimethylpentanol. A 50.3% conversion and a 90% yield are obtained.

*Example XI*

The catalyst bed of Example X is regenerated by passing air and steam through the bed at a temperature of about 500° C. until substantially all carbon is removed from the catalyst. This catalyst is heated to a temperature of about 460° C. and about 1,410 parts of 2,2,4-trimethylpentanol is passed through the tube at a contact time of about 6.5 seconds. There is collected 1,342 parts of organic material. Atmospheric distillation yields about 20 parts of low boiling organic compounds, about 1,057 parts of 2,2,4-trimethylpentanal having a boiling point of about 145° C., and 263 parts of unreacted alcohol. A 76.1% conversion and a 93.5% yield are obtained in this example.

*Example XII*

A reactor tube, similar to that of Example IV, is packed with about 40 parts of fresh catalyst pellets prepared in accordance with Example II above. The tube is heated to about 445° C. and about 1,845 parts of 2-ethylisohexanol is passed through the reaction tube with a contact time of 10 seconds. There is recovered about 1,795 parts of organic material. Atmospheric distillation of this organic material yields about 35 parts of low boiling organic materials, about 1,180 parts of 2-ethylisohexanal and 485 parts of unreacted alcohol. In this example, there are a 65.5% conversion and a 93.1% yield.

*Example XIII*

A reactor tube, similar to that employed in Example IV, is packed with about 38.9 parts of ⅛-inch pellets of Example I. A feed material containing 91.8% by weight of mixed butanols and 8.2% by weight of higher boiling alcohols is passed through the reactor tube. A total of 2,182 parts of this feed material is passed through the tube which was heated to 480° C. and at a contact time of 8 seconds. There is obtained about 780 parts of mixed butraldehydes and about 1,350 parts of residue. A 44% conversion and a yield of 80.4% are obtained.

*Example XIV*

A reactor tube, similar to that of Example IV, is packed with about 38.9 parts of ⅛-inch pellets prepared in accordance with Example I above. The reactor is heated to about 480° C. and about 8,037 parts of a mixture of octyl alcohols (41% 2-ethylhexanol and 59% 2-ethylisohexanol) is passed through the reactor tube and the contact time was 10 seconds. There is recovered about 7,740 parts of organic material. Atmospheric distillation yields about 80 parts of low boiling organic compounds, about 4,668 parts of mixed aldehydes (41% 2-ethylhexanal and 59% 2-ethylisohexanal), and 2,993 parts of unreacted alcohols. A conversion of 59% and a 94.3% yield are obtained in this example.

*Example XV*

A dehydrogenation or reactor tube, similar to that employed in Example IV, is packed with about 38.9 parts of ⅛-inch pellet prepared in accordance with Example I above. The reactor is heated to about 470° C. and about 656 parts of n-butanol is passed through at a contact time of 6 seconds. There is collected a total of 581 parts of organic material. Distillation yields about 8 parts of low boiling organic compounds, 383 parts of n-butraldehyde, and 190 parts of unreacted alcohol. A 60% conversion and an 84.6% yield are obtained.

*Example XVI*

The same reactor as employed in Example XV is heated to about 500° C. and 972 parts of n-butanol passed through at a contact time of 5.7 seconds. There are recovered 823 parts of condensation products. This is an 84.8% recovery. Distillation yields 10 parts of low boiling point organic compounds, 530 parts of n-butraldehyde and 280 parts of unreacted alcohol. In this example there are a 56.2% conversion and a 78.6% yield.

*Example XVII*

A reactor tube, similar to that employed in Example IV above, is packed with about 39 parts of ⅛-inch pellets prepared in accordance with Example III above. The reactor is heated to about 430° C. and 932 parts of 2,2,4-trimethylpentenol is passed through at a contact time of about 7.2 seconds. A total of 413 parts of condensate is recovered. Atmospheric distillation of this condensate yields 36 parts of low boiling point organic compounds, 249 parts of 2,2,4-trimethylpentenal having a boiling point of about 149° C., a specific gravity (20° C./20° C.) of 0.4884, and an $n_D^{25}$ equal to 1.4299. About 128 parts of unreacted alcohol is recovered also.

In this example there are obtained a 58.5% conversion and 82.7% yield.

Table I below illustrates the effect of temperature upon the conversion and yield during dehydrogenation of 2-ethylhexanol. The contact time of the alcohol with the catalyst is about 10 seconds. Catalyst pellets prepared in accordance with Example I are used.

TABLE I

| Temperature, °F. | Conversion, percent | Yield, percent |
| --- | --- | --- |
| 716 | 36.9 | 97.2 |
| 752 | 47.8 | 95.4 |
| 798 | 64.6 | 96.8 |
| 860 | 55.2 | 85.2 |
| 932 | 46.1 | 79.3 |

To test the thermal stability of the catalyst of this invention a two-weeks continuous test was run on the dehydrogenation of 2-ethylhexanol. The run was made at 820° F. and the contact time was 10 seconds. The catalyst pellets employed were prepared in accordance with Example I. The over-all conversion was 70% and the yield was 96.2%. From this information it is estimated that the catalyst employed will last from about three months to five months without regeneration. The catalyst can be regenerated by passing air and superheated steam through the catalyst at a temperature of about 1000° F. to 1200° F. until substantially all carbon is removed from the catalyst. It has been determined further that water is not harmful to the catalyst, and there is no special activation procedure required for this catalyst.

The data set forth in Table II below shows comparative test results obtained when 2-ethylhexanol was passed into contact with pellets of several prior art catalysts and the catalysts of this invention. All runs were made at 716° F. and 10 seconds contact time.

TABLE II

| Catalyst Composition | Conversion, Percent | Percent Yield To— | |
| --- | --- | --- | --- |
| | | 2-ethyl-hexene-1 | 2-ethyl-hexanal |
| Gamma alumina | 0.6 | 25 | 1 |
| Zinc oxide | 25 | 18 | 75 |
| 3% $Cr_2O_3$ on gamma alumina | 1 | 28 | 3 |
| Catalyst of Example I | 36.9 | 1 | 97.2 |
| Catalyst of Example II | 40.3 | 1 | 96.9 |

The importance of keeping the $Cr_2O_3$ content of the catalyst of this invention below about 5% by weight is emphasized in Table III below. Six different catalysts were prepared in which all components were maintained constant with the exception that the amounts of $K_2CrO_4$ and zinc oxide were varied in each catalyst. Thus the amount of gamma alumina in each catalyst was 7.6%, the amount of MgO in each catalyst was 4.7%, the amount of CaO in each catalyst was 4.7%, and the amount of $K_2SO_4$ in each catalyst was 2.8. The amount of $K_2CrO_4$ was varied in each catalyst as indicated in the table and zinc oxide represents the balance. As previously set forth, the $CrO_3$ of the $K_2CrO_4$, during initial reaction stages, is reduced to $Cr_2O_3$ and $K_2O$. The amount of $Cr_2O_3$ present in the catalyst after reduction is set forth in the table.

The alcohol employed in the dehydrogenation reaction was 2-ethylhexanol, and all runs were made at 716° C. and at a 10 second contact time.

TABLE III

| Run | Percent $K_2CrO_4$ present in original composition | Percent $Cr_2O_3$ present after reduction | Percent yield of 2-ethyl-hexanal |
| --- | --- | --- | --- |
| 1 | 2.8 | 1.1 | 97.0 |
| 2 | 5.2 | 2 | 96.9 |
| 3 | 10.4 | 4 | 93.7 |
| 4 | 13.1 | 5 | 90.1 |
| 5 | 26.2 | 10 | 73.1 |
| 6 | 39.0 | 15 | 55.2 |

It is to be understood that the above description and examples are illustrative of this invention and not in limitation thereof.

We claim:

1. In a process for the catalytic conversion of primary alcohols containing from 4 to 14 carbon atoms to the corresponding aldehyde, the steps which comprise heating to a temperature of from about 285° C. to 510° C. a catalyst comprised of, by weight, (1) from about 3% to 5% of calcium oxide, (2) from about 3% to 5% of magnesium oxide, (3) from about 2% to 4% of potassium sulfate, (4) from about 5% to 15% gamma alumina, (5) from about 1% to 5% of chromic oxide, $Cr_2O_3$, and (6) the balance substantially all zinc oxide, contacting with the heated catalyst vapors of the alcohol to be converted to the aldehyde at a rate of from about 0.5–8 volumes of liquid alcohol per volume of catalyst per hour whereby product vapors are formed, condensing the product vapors and separating therefrom the product aldehyde.

2. In a process for the catalytic conversion of primary alcohols containing from 4 to 14 carbon atoms, the steps which comprise heating to a temperature of from about 285° C. to 510° C. a catalyst comprised of, by weight, about 77.4% zinc oxide, about 7.6% gamma alumina, about 4.7% calcium oxide, about 4.7% magnesium oxide, about 2.8% potassium sulfate, about 1.1% chromic oxide, $Cr_2O_3$, and about 1.7% potassium oxide, contacting therewith vapors of the alcohol to be converted to the aldehyde at a rate of from about 0.5–8 volumes of liquid alcohol per volume of catalyst per hour whereby product vapors are formed, condensing the product vapors, and separating therefrom the product aldehyde.

References Cited by the Examiner

UNITED STATES PATENTS

| | | | |
| --- | --- | --- | --- |
| 1,999,196 | 4/1935 | Lazier | 260—596 |
| 2,046,166 | 6/1936 | Jenks | 252—440 |
| 2,378,209 | 6/1945 | Fuller et al. | 252—468 |
| 2,501,042 | 3/1950 | Gear | 260—603 |
| 2,504,034 | 4/1950 | Morrell et al. | 252—440 |
| 2,588,359 | 3/1952 | Chitwood et al. | 252—440 |
| 2,595,943 | 5/1952 | Heinemann | 252—440 |
| 2,884,460 | 4/1959 | Komarewsky | 260—603 |

FOREIGN PATENTS 323,713  12/1929  Great Britain.

LEON ZITVER, *Primary Examiner.*

CHARLES B. PARKER, *Examiner.*

J. J. SETELIK, B. HELFIN, *Assistant Examiners.*